United States Patent [19]
Doncer et al.

[11] 3,811,324
[45] May 21, 1974

[54] PROPORTIONAL SAMPLING APPARATUS AND METHOD

[75] Inventors: Alex J. Doncer, Burbank; Harold R. White, New Lenox, both of Ill.

[73] Assignee: Alar Engineering Corporation, Burbank, Calif.

[22] Filed: June 5, 1972

[21] Appl. No.: 259,497

[52] U.S. Cl. .............................................. 73/421 B
[51] Int. Cl. ............................................. G01n 1/14
[58] Field of Search ..................... 73/421 B; 417/14

[56] References Cited
UNITED STATES PATENTS

| | | | |
|---|---|---|---|
| 3,412,612 | 11/1968 | Carr | 73/421 B |
| 3,120,128 | 2/1964 | Snyder | 73/421 B |
| 2,270,511 | 1/1942 | Crain | 73/421 B |

*Primary Examiner*—S. Clement Swisher
*Attorney, Agent, or Firm*—Hill, Gross, Simpson, Van Santen, Steadman, Chiara & Simpson

[57] ABSTRACT

A proportional sampling system automatically obtains selected samples at selected intervals in a quantity directly proportionate to the volume of flow in a stream and removes the samples for cumulation in a collection receptacle at a remote point.

7 Claims, 6 Drawing Figures

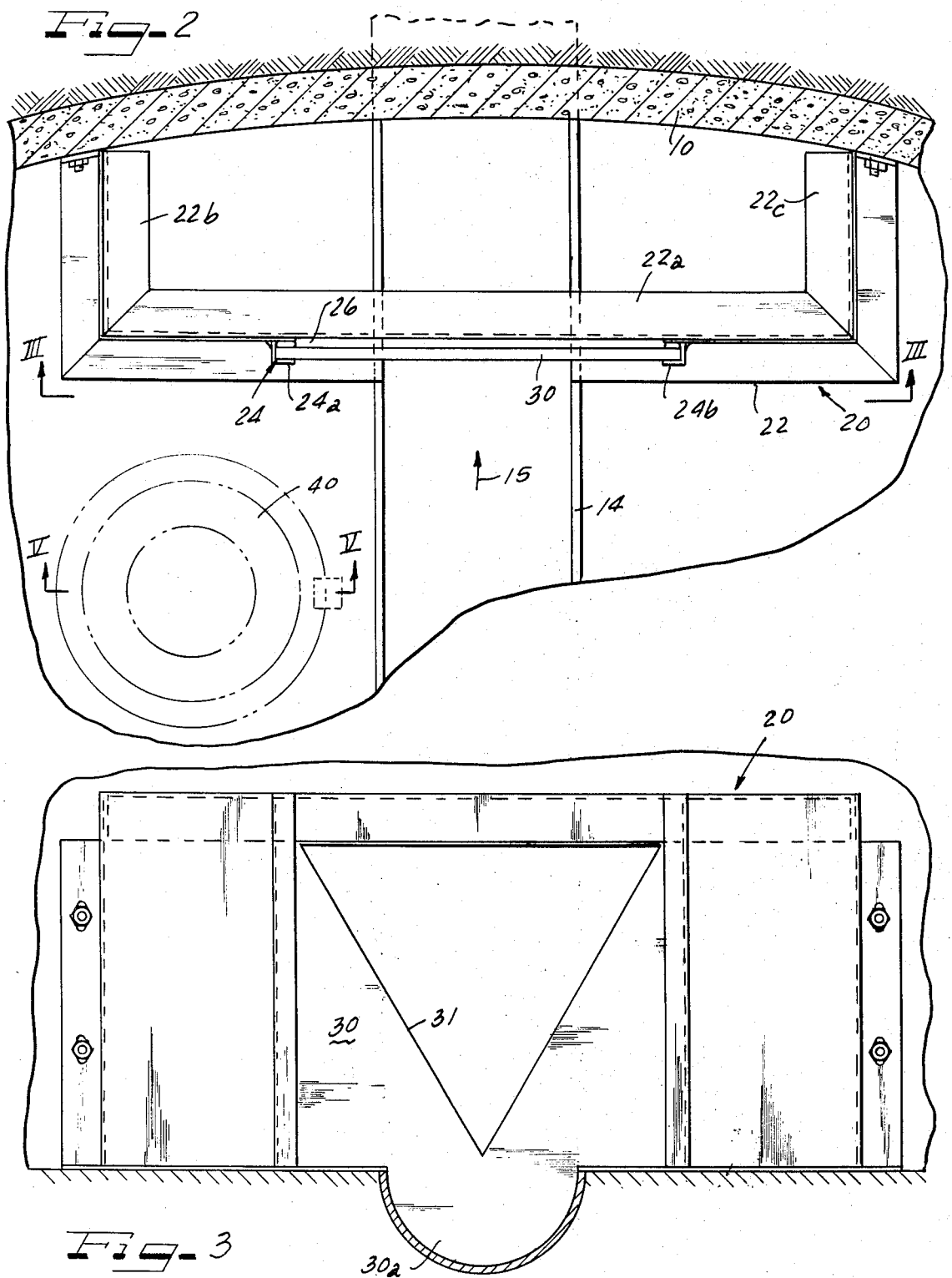

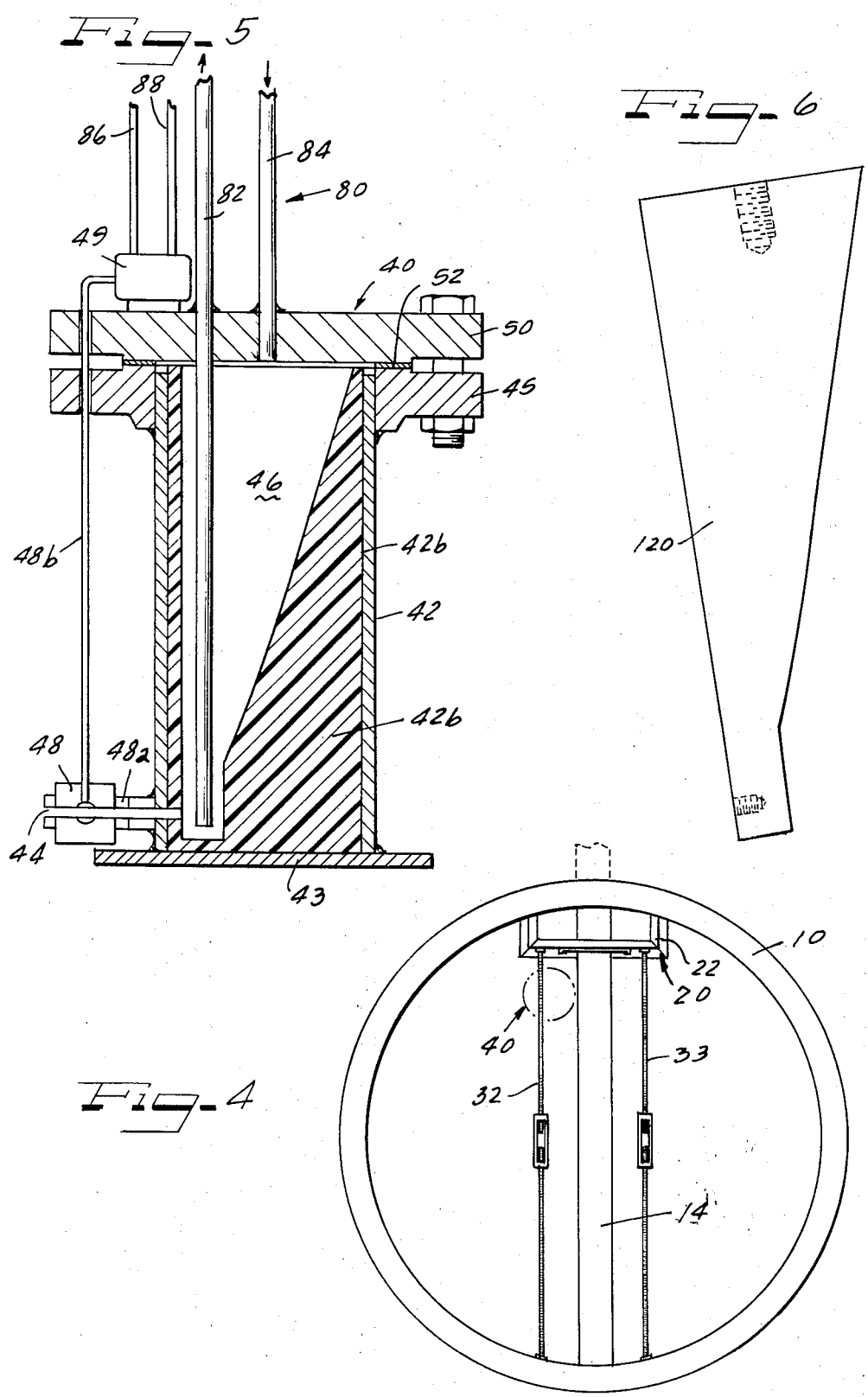

PROPORTIONAL SAMPLING APPARATUS AND METHOD

BACKGROUND OF THE INVENTION

1. Field of the Invention

This invention generally relates to pollution analysis and control and more particularly to a fluid sampling apparatus and method for obtaining a representative sample from a flowing stream.

2. Prior Art

In an effort to control water pollution, legislation has been enacted which requires owners of industrial plants to, for example, analyze an effluent sample composited in proportion to its flow for such factors as BOD and suspended solid. The analysis must be periodically reported to a government agency to determine whether a tax surcharge will be assessed for water treatment costs in excess of existing taxes. According to one existing law these tests are to be performed on five or seven consecutive days once each year. With the increasing public interest in controlling pollution it can be expected that the number, frequency and types of tests will increase in the future.

The present state of the art to our understanding is such that sampling of waste water such as is required by the law is normally performed manually by taking a sample of each effluent stream once an hour over the test period and measuring the flow of each effluent stream each time a sample is taken. The percentage of flow that each sample represents is then calculated and a measured amount of each sample is used to form the composite sample for each discharge point or location which is deemed to be representative of the total days effluent.

With the methods and apparatus of the prior art this normal operation is not only tedious and time consuming but may be very inaccurate. Thus, where the law requires a sample to be taken every hour at a particular location, an individual will be required to go to the location where the sample is to be taken, take the sample, check the flow and record it. When the location is a typical access manhole the manpower required to go to the location every hour, open the manhole, measure the flow, obtain a representative sample, dip the sample out of the manhole and then mix and store the samples for future testing is extremely burdensome. Accordingly, the prior art may be seen to severly limit the testing which is possible.

The present alternative to the above manual sampling program is the installation of very complex metering equipment and sample pumps or mechanical apparatus to take the desired hourly samples. Since such equipment is used only one week per year and the initial costs and maintenance expense are relatively high, its use is not justified for periodic sampling programs.

SUMMARY OF THE INVENTION

It is an object of our invention to overcome the disadvantages of the prior art and to provide an inexpensive and reliable means of obtaining flow proportion samples at a relatively low cost without continuous manual supervision. Our proportional sampling system provides a method and apparatus for automatically and accurately obtaining any number of samples at any interval of time in a quantity directly proportionate to the volume of flow in the stream being measured. By means of our invention vast new areas of the control and testing of pollution are feasible which would never have been possible under the prior art methods.

The proportional sampling system comprises a first measuring means such as a weir which produces a change in liquid level in a flow stream proportionate to the change in flow rate in the flow stream when the first means is set in place to obstruct the flow in the stream. A proportional sampler having a chamber designed in a specific configuration proportional to the flow in the stream is immersed in the stream in predetermined relationship to the weir. Thus, in the embodiment described herein the bottom of the sampler chamber has an inlet opening which is arranged to be in correspondence with the bottom of a V-notch of the weir. By automatic control, a valve in the inlet opening to the sampler chamber is periodically opened for a specified unit of time whereupon the level of liquid in the sampler chamber will achieve the same level as the liquid in the stream behind the weir. The valve to the inlet is then closed and the sample is expelled out of the chamber by air pressure to a storage container which may, where required, be refrigerated. The storage container may be at a point remote from the point of sample collection and will allow easy removal of the sample for testing and analysis. This simple and efficient apparatus thereby provides for very economical and accurate effluent analysis.

The first measuring means producing a change in liquid level proportionate to a change in flow rate in a stream advantageously comprises a frame having a removable weir plate therein whereby the weir plate may be removed when the flow stream is not being tested to allow unrestricted flow in the stream. The frame furthermore may provide a support for the proportional sampler so that placement of the sampling system in the manhole or other location to be tested may basically amount to dropping the weir plate into position with a suitable guide arrangement and affixing the proportional sampling means to the frame in predetermined relation to the weir plate.

The weir plate will obstruct the normal flow in the fluid line and cause it to back up to a level at which it will pass over the weir to proceed in its normal course. The increase in level caused by the fluid having to pass over the weir is proportionate to the flow and brings the fluid level into range of the proportional sampling chamber which samples the flow as set forth above.

A third unit of our system provides the means for controlling the collection of the sample and the removal of the sample to a collection vessel which vessel may be at a point remote from the sampling point. Moreover, according to our invention it is a great advantage that a plurality of proportional sampling means may be positioned at different effluent locations surrounding a single industrial facility and that simultaneous sampling may be performed at these locations. The third unit of our system allows the automatic control and simultaneous sampling. This unit includes a source of air pressure which inlets to a control board system and has air pressure conduits extending therefrom to each of the sampling locations. A solenoid means at the control board regulates the introduction of air to a valve operator which in turn serves to open and close an inlet valve to the sample chamber. The sample chamber is generally air tight except for an air inlet pipe extending from a solenoid control at the control board to a point in the chamber generally above the expected level of fluid in the chamber and except for a sample outlet pipe extending upwardly from adjacent the bottom of the chamber to a remotely located sample collection receptacle. The sample collection receptacle is vented so that the chamber in turn is vented through the sample outlet pipe whereby when the valve is opened the sample will enter the chamber under the force of gravity and seek a level equal to that of surrounding fluid in the area to be tested. By means of a timer programmer on the control board the inlet valve is closed after a predetermined time interval and the timer programmer than activates one of the solenoids to allow air to pass from the air source to the chamber via the air inlet pipe. The pressure on the fluid sample forces it up through the sample outlet pipe to the vented collection receptacle. The removal process is continued to be sure that all of the sample has been conveyed to the collection receptacle. As a further step in our method we have found it advantageous to control the inlet valve to open while the air pressure is in the sample chamber and after the sample has been thoroughly removed whereby the air pressure blows out through the inlet pipe to clean it of any possible obstructions. While the inlet pipe is being blown out the inlet valve is again closed and the inlet air automatically cut off to prepare the chamber for the next sample.

The collection receptacle may then be emptied as required at suitable intervals and the contents tested. Where a plurality of effluent locations are being sampled the receptacle container may comprise a single means in which the samples are comingled or the samples from each location may be individually segregated.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which:

FIG. 2 is an enlarged plan view of the portion of FIG. 1 taken along the lines II-II and illustrating the first unit anchored to the manhole wall with the removable weir plate in position;

FIG. 3 is an elevational view of the first unit of FIG. 2 taken along the lines III—III and showing a triangular weir configuration;

FIG. 4 is a schematic plan view of the first unit being held in position in a manhole by an alternate jackscrew arrangement;

FIG. 5 is an enlarged cross sectional view of the proportional sampler unit showing the air pressure sample inlet and removal arrangement; and, FIG. 6 is a cross section of a core mold further illustrating the predetermined configuration of the sample chamber.

DESCRIPTION OF THE PREFERRED EMBODIMENT

Figure 1:
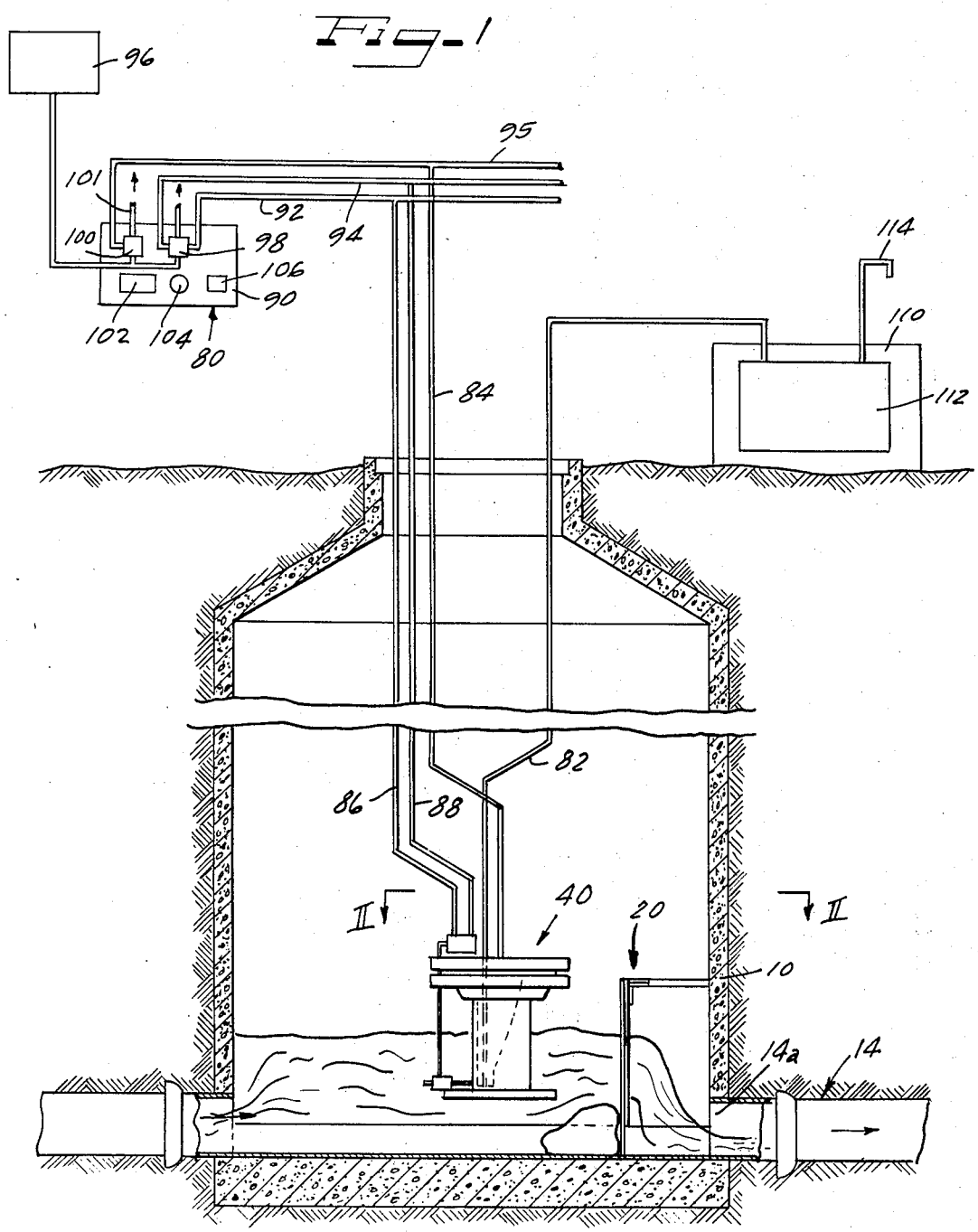
FIG. 1 is a schematic elevational cross sectional view of the system in use in a typical sewer manhole.

Referring to FIG. 1 the proportional sampling system of the invention is shown in position in a typical manhole structure 10 at a point along a sewer pipeline 14. In this arrangement a first unit of the system, which may be a weir generally indicated at 20, serves to obstruct the flow of fluid through the pipe 10 and raise its level above the normal level of flow in the pipe 14 so that the fluid enters a chamber in the second unit of the system generally indicated at 40. The second unit 40 is positioned in a predetermined relationship with respect to the first unit 20 so that the sample quantity is related to the fluid level caused by the first unit and thus in turn is related to the flow of fluid in the line 14. A third unit of the system generally indicated at 80 automatically controls the inlet of the fluid to the second unit and, by a suitable arrangement of conduits as shown, transfers a selected sample at predetermined periodic intervals from the second unit 40 to a storage means 110. The thus collected samples are then removed from the storage means 110 for testing and analysis as required.

The first unit 20 of this system is a primary flow measuring means positionable in the line 14 at the manhole 10 to obstruct flow through the line and thereby produce a change in the flow level upstream of the measuring means proportionate to a change in the flow rate in the stream. As shown in the enlarged plan view of FIG. 2, which is taken along the line II—II of FIG. 1, the first unit 20 may be seen to comprise a frame 22 having a first portion 22a extending transversely of the sewer line 14 and having angularly inclined leg portions 22b, 22c at opposite ends thereof to position the first portion 22a with respect to the wall of the manhole 10. The frame 22 is advantageously fabricated of suitable structural members such as the right angular member shown. In the embodiment of FIG. 2 the frame 22 is shown generally permanently mounted in the manhole 10 by means of ackerman connectors extending through a flange on each of the legs 22b, 22c directly into the wall of the manhole 10. It will be understood that the pressure of the fluid backed-up by the damming unit 20 as shown in FIG. 1 will tend to assist in holding the unit in position.

A guide means generally indicated at 24 may comprise a pair of generally parallel opposed channel shaped members 24a, 24b, generally vertically inclined. The guides 24a, 24b may be adjacent to a central opening 26 in the first unit 20. A removable weir plate 30 may be slidably received in the guides 24a, 24b, in generally guillotine fashion as shown in FIGS. 2 and 3 to obstruct the flow of fluid indicated by the arrow 15 in the line 14. The weir plate 30 may include a suitable portion 30a extending into the line 14 to close off fluid flow therealong and back up the fluid on the upstream side of the plate. The weir plate 30 may have a V-shaped notch 31 of 60° as shown or may be of any other notch configuration necessary to obtain a reasonable variation in fluid level on the upstream side of the plate. Thus, the weir notch may be a standard 90° angle construction or may also be a rectangular weir of any dimension suitable to obtain the reasonable variation in liquid level with the expected flow. While a weir has been disclosed as a primary measuring element, it should be understood that other elements, such as flumes, flow nozzles or orifice devices which produce a variation in liquid level with fluid flow rates may also be used. An important feature of our primary measuring unit 20 and the measuring device 30 is that the flow measuring device 30 is removable so that it is only in contact with the effluent during the required sampling period. Thus, during normal, non-sampling periods of operation the flow in the sewer with the plate 30 removed will be unobstructed and substantially free flowing whereby the effluent will not become septic. The opening 26 will be substantially larger than the area of the pipe opening 14a so that even at peak flows through the manhole 10 the frame member 22 will not impede its flow.

Our design presents many advantages over the existing state of the art. Thus, the primary measuring bracket may be either permanently installed in a manhole as shown in FIG. 2 and can be left in the sewer indefinitely or, the flow measuring means 20 may be temporarily mounted by an arrangement as shown in FIG. 4 and be moved from one location to another as required. In the schematic representation in FIG. 4 there is shown one way by which a pair of jackscrews 32, 33 may be mounted between the upstream side of the frame 22 and the opposite wall of the manhole 10. By means of the jackscrews 32, 33 the frame 22 may be held against the wall of the manhole 10 surrounding the outlet of the pipe 14. It is a feature of our invention that the measuring unit 20 may be installed in sewer manholes or other constructions of any dimensions, depth or manner of construction. The unit is readily adaptable to all conditions of use. Moreover, the exchangeability of weir plate measuring device 30 allows rapid adaptation of the device to all expected conditions of fluid flow. Then, after the sampling has been completed the weir plate 30 may be easily and quickly removed out of the flow of the effluent to minimize corrosion, plugging, fouling and other maintenance problems associated with long periods of inactivity in an adverse environment.

With the frame 22 in position either permanently or temporarily the removable primary measuring element 30 may be set into place in the flow stream 14 with its alignment and elevation properly set. Accordingly, a minimum of time and labor is required to put this system into use and to take it out of use. It is within the contemplation of our invention that the removable weir plate measuring element 30 may be simply raised out of the flow channel 14 to a height where it would not be expected to interfere with peak flows and there left until the next test period. The flow stream in the pipe 14 is thus permitted to return to its normal free flowing operations.

The second unit of the system generally indicated at 40 in FIG. 1 and shown in enlarged cross section in FIG. 5 comprises an outer body 42 of material suitable to withstand the environment in which it is to operate, a sampling inlet 44 leading to the bottom of the chamber 46 and a valve 48 in the inlet 44. The unit 40 is positioned in predetermined relation to the weir notch 32 such that the level of the liquid in the stream will ordinarily be above the inlet 44 during the sampling period whereby when the valve 48 is opened a sample of the liquid proportional to the volume of flow will enter the chamber 46 through the inlet 44. After a predetermined time interval the valve 48 will close and the sample in the chamber 46 may then be removed through the eduction tube 82 to the storage receptacle 110.

In practice we have found that the outer body 42 may comprise a cylindrical shell 42a approximately four inches in diameter and ten inches long having a liner 42b snugly fitting within the inside diameter of the outer shell 42a. A flange 43 which may be suitably secured to the outer shell 42a closes off the lower end of the outer shell and provides a support for the liner 42b. A flange 45 may be secured in place about the upper edge of the outer shell 42a by suitable means such as welding so that the top of the flange 45 is generally in alignment with the top of the body portion 42. Where the control of the apparatus and removal of the sample is accomplished by pneumatic means we seal the chamber 46 by a top plate 50 suitably bolted to the flange 45 and having a suitable seal 52 therebetween. This provides a chamber 46 which is generally airtight except for the outlet tube 82. As a result, after the sample has entered the chamber 46 and the valve 48 has been closed the sample in the chamber may be removed by the introduction of air or other fluid pressure through the inlet pipe 84 to force the sample upwardly through the outlet tube 82 into the reservoir 100. The valve 48 may be a one-quarter inch ball valve which is attached to the shell 42a by a valve coupling 48a and has a valve handle extension 48b extending from the valve 48 to a conventional valve operator 49. When the valve operator 49 is a two-way air cylinder it may be connected by suitable air conduits 86 and 88 in parallel with air pressure conduits 92, 94, respectively through a master air pressure control board 90 which regulates the flow of pressurized air from a source 96. The sampling system control unit contains a four way solenoid 98, a three way solenoid 100, a step cycle control 102, an adjustable timer 104 and a cycle counter 106. The representation of the system in FIG. 1 will be understood to be schematic for clarity of description.

The sequence of operations in the use of our system comprises the following steps. At the commencement of the sampling period, the removable weir plate 30 is inserted into the guide means 24 on the frame 22 to obstruct the normal flow in the line 14 thereby causing an accumulation of liquid on the upstream side of the unit 20 in the manhole 10 with the liquid reaching a level above the weir notch 31 proportionate to its rate of flow in the line 14 being sampled. Thus, as the flow in the line 14 increases the level of the liquid held back by the weir unit 20 will increase and vice versa. By means of the adjustable timer controller 104 on the control unit 80 the system may be set to draw a sample at a predetermined frequency of, say, 15, 30 or 60 minutes from the stream and deposit it in the storage unit 110. At the designated interval, the timer programmer 104 activates the solenoid 98 to allow air pressure from the air pressure source 96 to flow through the conduits 92, 86 and 94, 88 to the air cylinder control valve 49 on the second unit 40 to open the valve 48 in the inlet pipe 44. Since the sampler chamber 46 is vented to the atmosphere through the outlet tube 82, the vessel 112 and a vent 114, and solenoid valve 100 by an outlet 101, the chamber 46 will fill with a sample of the effluent to a liquid level equal to the flow level over the weir 31.

After a predetermined interval say one to four minutes, the timer programmer 104 reverses the position of the solenoid valve 98 to apply air to the opposite end of the air cylinder in the valve control 49 to close the sample inlet valve 48. The timer programmer 104 then opens the solenoid valve 100 to allow fluid under pressure from the source 96 to enter the top of the chamber 46 through the inlet conduit 84. This fluid pressure forces the liquid sample in the otherwise air tight chamber 46 up through the eduction tube 82 through tubing into the sample collector vessel 112 where the liquid stays at the bottom of the vessel 112 and the air pressure exhausts through the vent 114. To be sure that the complete sample has passed upwardly through the tubing it is advisable to allow the fluid pressure to blow through the tubing for a suitable interval.

With the sample thus collected the timer programmer 104 reverses the position of solenoid valve 98 to apply pressure to the air cylinder valve operator 49 to open the sample inlet valve 48. If the valve 48 is opened while the chamber 46 is still under pressure from inlet 84, air is blown through the sample intake tube 44 outwardly into the flow stream to remove any residual material and any obstruction which may have lodged in the intake line. After a suitable interval, the timer programmer 104 reverses the position of solenoid valve 98 to close the sample intake valve 48. At about this time the timer programmer 104 deactivates the solenoid valve 100 to turn off the air pressure through the inlet 84 to the sample chamber 46. The sample chamber 46 vents through the collection vessel 112 and solenoid valve 100 and remains empty until the next sample is to be taken. This completes a typical cycle of collection.

Referring to FIG. 1 it may be seen that the air conduits 92, 94, 95 may continue on to other similar testing apparatuses whereby a plurality of tests will be run simultaneously. Thus, it is envisioned that if the facility being tested, say a factory, has six sewer outlets that these outlets may be tested simultaneously to provide an exact indication of what is being disposed of in the facility at that time. Moreover in such an installation, the percentage of flow passing through each sewer can be calculated from the total volume of sample collected in the individual sample collection container 112. In the alternative of course the collection facility 110 may include a container vessel for each sewer. For installations where no air pressure is available, a small diaphragm type air compressor in the order of one third horsepower for example, may be supplied with the control unit to provide the source of air 96. The compressor may be controlled by an additional cam in the timer to start the compressor just prior to the sample cycle and to stop the compressor after the completion of the cycle.

FIG. 6 illustrates a core mold showing how the shape of the sample chamber 46 may be made in accordance with predetermined dimensions. An important concept in the proportional sampler of this invention resides in making the interior of the sample unit 40, i.e., sample chamber 46, in a very specific and precise configuration which will bear a predetermined proportional relationship to the flow in the stream being measured. The core mold 120 as shown will have a generally frusto conical configuration and be of a dimension determined by imperical data in accordance with hydraulic technology.

In view of the foregoing description of our invention it may be seen that we have overcome the disadvantages of the prior art and provided an inexpensive and reliable means of obtaining flow proportioned samples at a relatively low cost without continuous manual supervision.

Although minor modifications might be suggested by those versed in the art, it should be understood that we wish to embody within the scope of the patent warranted hereon all such modifications as might reasonably and properly come within the scope of our contribution to the art.

We claim:

1. A method of obtaining a sample proportionate to the volume of flow in a stream comprising the steps of causing the flow in the stream to pass over a primary measuring element whereby the upstream flow will assume a level proportionate to its flow, removing a sample of a quantity exactly proportionate to the flow at predetermined time intervals by means of a sampling chamber situated in predetermined relationship to said element, automatically controlling the inlet to the sampling chamber, opening and closing said inlet by means of a pneumatic valve operator and conveying said sample to said collection chamber by closing said inlet, automatically conveying the sample to a collection chamber by introducing air to said sampling chamber to force said sample upwardly through an eduction tube having an opening adjacent the bottom of said sampling chamber to said collection chamber.

2. A method according to claim 1 including cleaning said inlet by opening said inlet while said air is being introduced to said chamber and after said sample has been conveyed to said collection chamber.

3. A method according to claim 1 wherein the upstream flow assumes a level proportionate to its flow by obstructing the normal flow in said stream by inserting a weir plate having a weir notch therein into an opening of said primary measuring element to thereby cause an accumulation of liquid on the upstream side of the primary measuring element, wherein the sampling chamber is positioned with its inlet generally on the same level as the bottom of the weir notch, allowing a sample of the fluid to enter the sampling chamber at predetermined intervals, closing the inlet and pneumatically conveying the sample to said collection chamber.

4. A method according to claim 3 including the additional step of proportioning the configuration of the sampling chamber to the flow through the weir notch, to obtain a sample of a volume proportional to the flow as measured by the level of the stream upstream of the weir notch.

5. In a proportional sampling system for a flow stream, a damming unit adapted to be positioned in the flow stream to produce a change in the level of the flow stream upstream of the damming unit, a removable weir plate slidably guided in said damming unit and positioned in said damming unit during a sampling operation and having an opening therein of a predetermined configuration to produce a variation in the liquid level upstream of said weir plate during a sampling operation, a sampling chamber upstream of said damming unit and weir plate and having a volume proportional to the flow past said opening in said weir plate, an inlet to said sampling unit in a predetermined relation with respect to the bottom of said opening in said weir plate, an inlet valve in said inlet, means selectively operable to vent the top of said sampling chamber during the collecting of a sample therein, a control panel remote from said valve and flow stream, a source of air under pressure, a selective connection from said source of air under pressure for supplying air under pressure to open and close said valve, another selective air connection leading from said control panel to said sampling chamber and providing air under pressure to said sampling chamber, a sample container remote from said sampling chamber, and an eductor leading from said sampling chamber for transferring a sample from said sampling chamber to said sample container by the pressure of air entering said sampling chamber.

6. The sampling system of claim 5, wherein individual solenoid controlled valves are provided on said control panel, one valve controlling the flow of air from said source of air under pressure to said inlet valve to open said inlet valve to collect the sample, to close said inlet valve upon the collection of the sample, and the other valve being selectively operable to supply air to said sampling chamber under pressure to educt the sample to said container remote from said sampling chamber upon closing of said inlet valve.

7. The sampling system of claim 6, wherein said collection container is vented to atmosphere, and wherein said sampling chamber is vented to atmosphere through said collection chamber to accommodate the inlet of a sample to said sampling chamber upon opening of said valve.

* * * * *